United States Patent [19]

Charnock et al.

[11] Patent Number: 5,216,799
[45] Date of Patent: Jun. 8, 1993

[54] CARBON FIBRE COMPOSITE WING MANUFACTURE

[75] Inventors: Paul Charnock; Robert Brown; Colin Whaites, all of Warton, Great Britain

[73] Assignee: British Aerospace Public Limited Company, London, England

[21] Appl. No.: 789,034

[22] Filed: Nov. 7, 1991

[30] Foreign Application Priority Data

Nov. 9, 1990 [GB] United Kingdom ............... 9024387

[51] Int. Cl.$^5$ .............................................. B23P 11/02
[52] U.S. Cl. .................................... 29/525.1; 29/448; 244/133
[58] Field of Search ................... 29/525.1, 897.2, 448, 29/457, 460; 244/123, 133, 117 R

[56] References Cited

U.S. PATENT DOCUMENTS

| | | | |
|---|---|---|---|
| 1,603,051 | 10/1926 | Hall | 29/897.2 X |
| 3,519,228 | 7/1970 | Windecker | 244/133 X |
| 3,857,150 | 12/1974 | Faucheux | 29/525.1 X |
| 4,014,089 | 3/1977 | Sato et al. | 29/525.1 |
| 4,530,147 | 7/1985 | Mattei et al. | 29/525.1 X |

OTHER PUBLICATIONS

R. M. Gill, *Carbon Fibres in Composite Materials*, Fibres and Composite Materials, 1972, pp. 6–11.
*Composites in aircraft construction*, Flight International, 23 May 1981, pp. 1551–1552.
Schier & Juergens, *Design Impact of Composites on Fighter Aircraft* Part I, 1983 AIAA pp. 44–49.
*New Materials Fly Better and Cheaper*, Mechanical Engineering, May 1982, pp. 20–24.

*Primary Examiner*—Timothy V. Eley
*Assistant Examiner*—C. Richard Martin
*Attorney, Agent, or Firm*—Cushman, Darby & Cushman

[57] ABSTRACT

A method of constructing a carbon fiber composite wing in which upper and lower skins are bonded to a pre-assembled rib 15 and spar 16 framework, thus obviating the need for metal fasteners and hence cutting down assembly time. In one embodiment a novel cleat 17 of cruciform cross-section replaces the four cleats conventionally used for bolting the ribs 15 and spars 16 together. Holes 22 drilled in either end of the cleats serve as jig location points during framework assembly and anti-peel fastener holes after the skins have been bonded.

5 Claims, 4 Drawing Sheets

CARBON FIBRE COMPOSITE WING MANUFACTURE

BACKGROUND OF THE INVENTION

This invention relates to methods of manufacturing aircraft wings using carbon fibre composite materials.

DESCRIPTION OF THE PRIOR ART

One known method of wing manufacture using carbon fibre composites (CFC) involves the steps of
(i) forming a lower skin of CFC
(ii) bonding uncured spars of CFC onto the lower skin during a curing process
(iii) attaching metal ribs to the cured CFC spars by means of metal cleats and
(iv) bolting a cured CFC upper skin to the ribs and spars using metal fasteners. A wing manufactured by this method is commonly referred to as a co-bonded wing.

The above method may be varied by curing and bonding the spars and lower skin together. This known technique results in a wing known as a co-cured wing.

FIGS. 1 and 2 show respectively a transverse cross-sectional view of part of a wing assembly and a perspective view of a part of a wing assembly.

Referring to FIG. 1, a spar 1 has, typically a 'J' shaped cross-section, the lower part of the spar being bonded to the lower skin 2. The upper part of the spar 1 is bolted to the upper skin 3 by a fastener 4 comprising a bolt and captive screw arrangement. A shim 5 is placed between the upper part of the spar 1 and the upper skin 3 so that the inner contours of the upper skin 3 match up with the upper surfaces of each spar 1 (and rib).

The ribs are bolted to the spars by V-shaped metal cleats. Four cleats are required per joint. The cleats have drilled holes to accommodate fasteners. In FIG. 2 one cleat 5 can be seen securing a rib member 6 to a spar 1 by means of a plurality of fasteners 7. Each cleat has to be machined to match the relative alignment of rib 6 and spar 1.

Disadvantages with both co-bonded and co-cured methods of wing assembly are the time-consuming procedures of bolting on the upper skin, preparing and inserting shims and machining and fitting the individual cleats. Furthermore there is the disadvantageous risk of delamination of the upper skin in the region of the fastener 4. This risk can be lessened to a certain extent by the use of I-section ribs and spars.

Another difficulty presented by these methods is encountered between steps (iii) and (iv) listed above at the stage where pipe-work and electrical cables need to be positioned into the wing structure. Because access to the inner wing structure is from one side only, positioning of pipework etc is awkward and therefore time consuming.

The problems of access and of having to use shims do not arise when manufacturing wings made entirely of metal. This is because when fitting upper and lower skins to the spar and rib assembly, they can be pulled into shape to match up with the contours of the upper and lower surfaces of the ribs and spars. This is done by tightening up the fasteners to the necessary degree. This of course cannot be done satisfactorily using CFC materials which are inherently brittle. Any attempt at pulling the skin would cause delamination.

BRIEF SUMMARY OF THE INVENTION

Objects of this invention are to mitigate the disadvantages mentioned above inherent in the co-bonded and co-cured methods of construction. In particular, the invention aims to provide a method of wing manufacture which is less time consuming than conventional methods and therefore less costly.

The present invention thus consists of a method of manufacturing an aircraft wing using carbon fibre composite materials comprising the steps of:
(i) forming upper and lower wing skins;
(ii) forming a framework of ribs and spars, said ribs and spars being joined together by cleats;
(iii) machining the framework to match the contours of the inner surfaces of the upper and lower wing skins;
(iv) bonding together the machined framework and upper and lower skins, the ribs, spars and wing skins all being of carbon fibre composite material.

It will be appreciated from the foregoing that all ribs, spars and wing skins are cured before bonding.

The above method thus dispenses with the need for fasteners for attaching the skins to the framework. As fasteners are time consuming to install, the invention greatly reduces manufacturing time and therefore cost. It also dispenses with the need for shims.

Access to the framework during pipe-work and electrical cable installation is greatly improved by virtue of the invention. Both sides of the rib/spar framework are accessible prior to bonding of the upper and lower skins.

Additionally, non-destructive testing on the framework before bonding of the skins is simpler as each rib or spar may be tested individually and replaced by a new piece if found to be faulty.

Further advantages which result from dispensing with conventional metal fasteners are the absence of arcing between fasteners as the result of a lightning strike and absence of the need to provide fuel-tight sealing around each fastener when appropriate.

However, as a safety measure metal fasteners may (optionally) be placed around the periphery of the wing if the wing is to be used as a fuel tank. This measure also helps to prevent peeling of the carbon fibre laminates around the edges of the wing.

Brackets for attachment to an aircraft fuselage are fitted to the finished wing as is conventional practice.

Preferably the ribs and spars are I-section beams for a stronger bond with the skins.

The spars and ribs may be jointed by conventional V-shaped cleats as described above or preferably by a novel cleat of cruciform cross-section.

The novel cleat is inserted in the space between four components to be jointed (i.e. two rib members and two spar members) and consists of a cylinder carrying four arms. Each arm is bolted with metal fasteners to one of the rib or spar members. This type of cleat is preferred because only one is required per joint instead of four.

Access to fastener holes in the arms of the cleat is available from both sides of the framework. Hence assembly time is much reduced.

A jig location can be incorporated into each cleat by drilling a hole along the longitudinal axis of the cylinder. Using this facility, the rib and spar framework can be assembled around the jigged cleats.

By careful design of the spar angles the number of variants of cleat arm angle per wing can be kept to a minimum. Also, with careful design, the cleats need not be handed for left and right wings.

On final assembly, when the wing skins are bonded in position, fasteners may be fitted in the redundant jig-location holes. These fasteners prevent peel of the carbon fibre laminates of the wing skins.

BRIEF DESCRIPTION OF THE DRAWINGS

Some embodiments of the invention will now be described by way of example only with reference to the drawings of which.

DETAILED DESCRIPTION OF THE PREFERRED EMBODIMENTS

Figure 1:
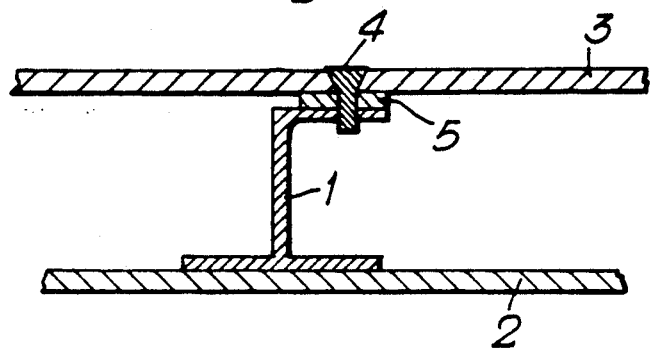
FIGS. 1 and 2 are views of an aircraft wing assembled by a known method of construction.
Figure 2:
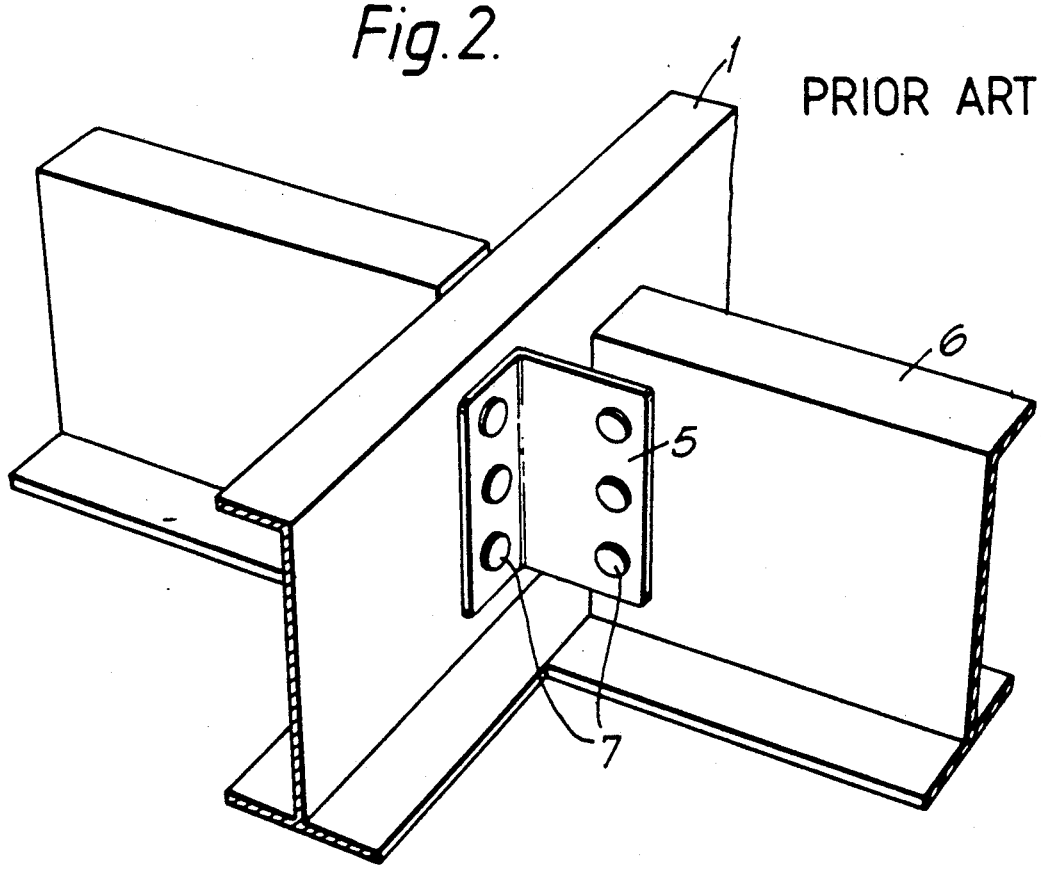
Figure 3:
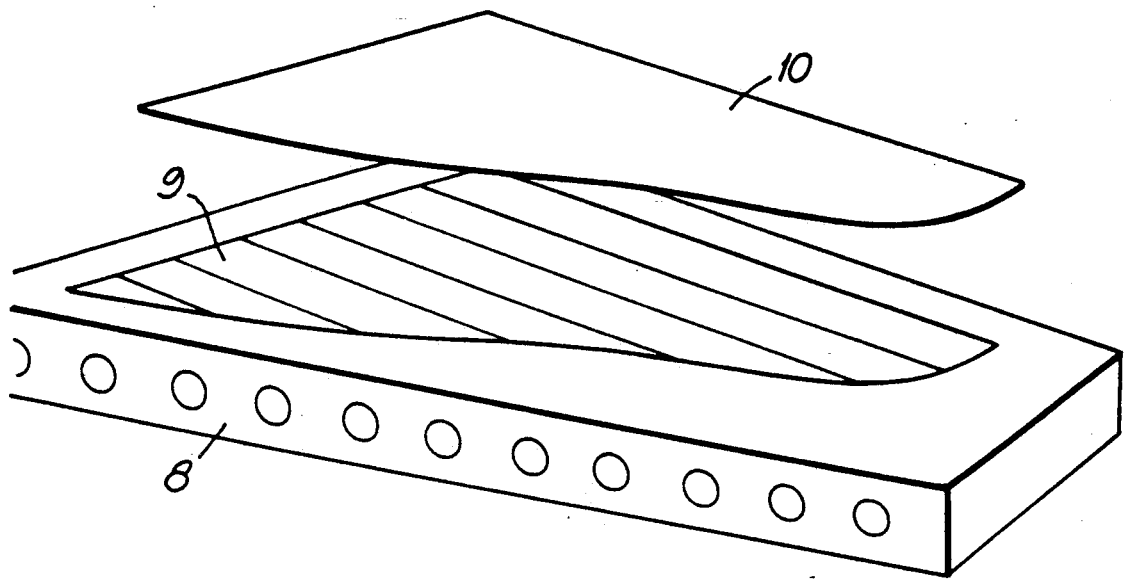
FIG. 3 is a perspective view of a wing skin mould tool in accordance with the invention.

In a first embodiment of the invention, upper and lower wing skins of CFC are formed to the skin's inner surface. In FIG. 3, an interface mould 8 tool locates the CFC wing skin plies 9 and a caul plate 10 is placed against the wing skin CPL face. The interface mould tool 8 forms the desired contours of the inner surface of the skin. The skins are then cured by conventional methods.

Figure 4:
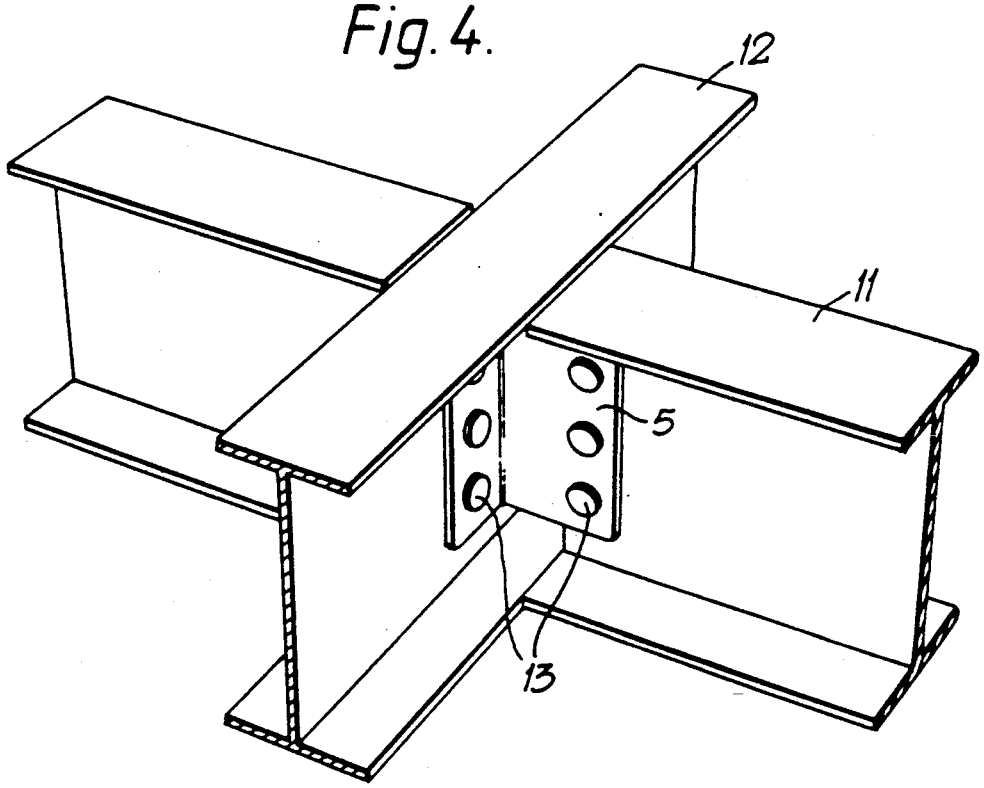
FIG. 4 is a perspective view of part of a spar and rib assembly according to one embodiment of the invention.
Figure 5:
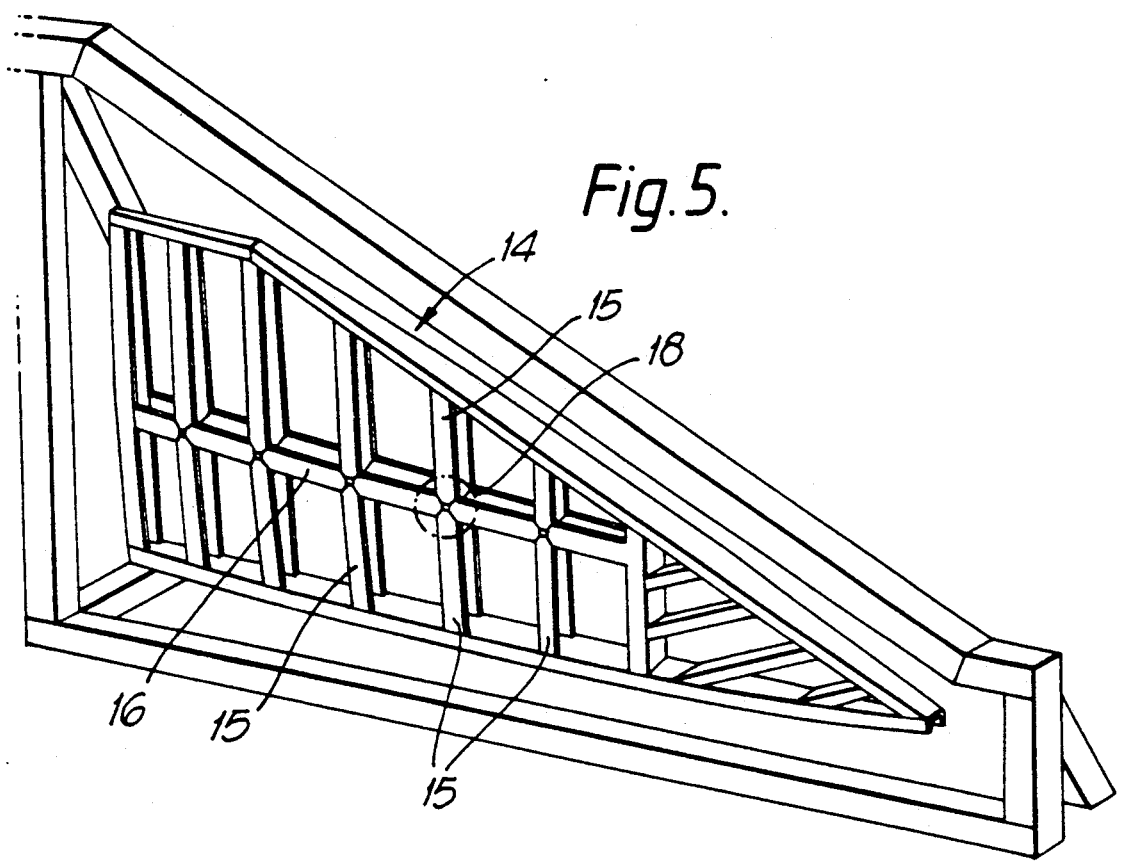
FIG. 5 is a perspective view of a rib and spar framework in accordance with the invention.
Figure 6:
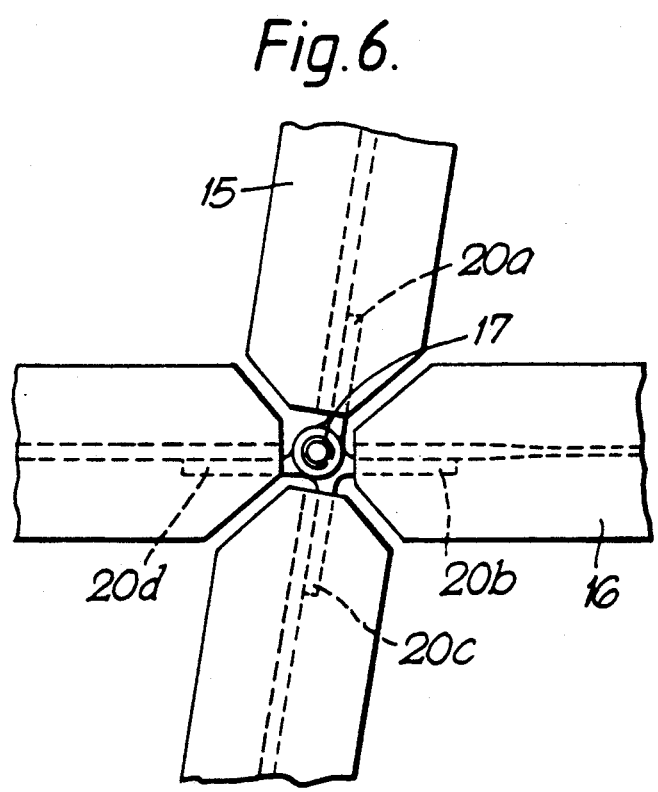
FIG. 6 is a plan view of a rib/spar joint in accordance with a second embodiment of the invention.
Figure 7:
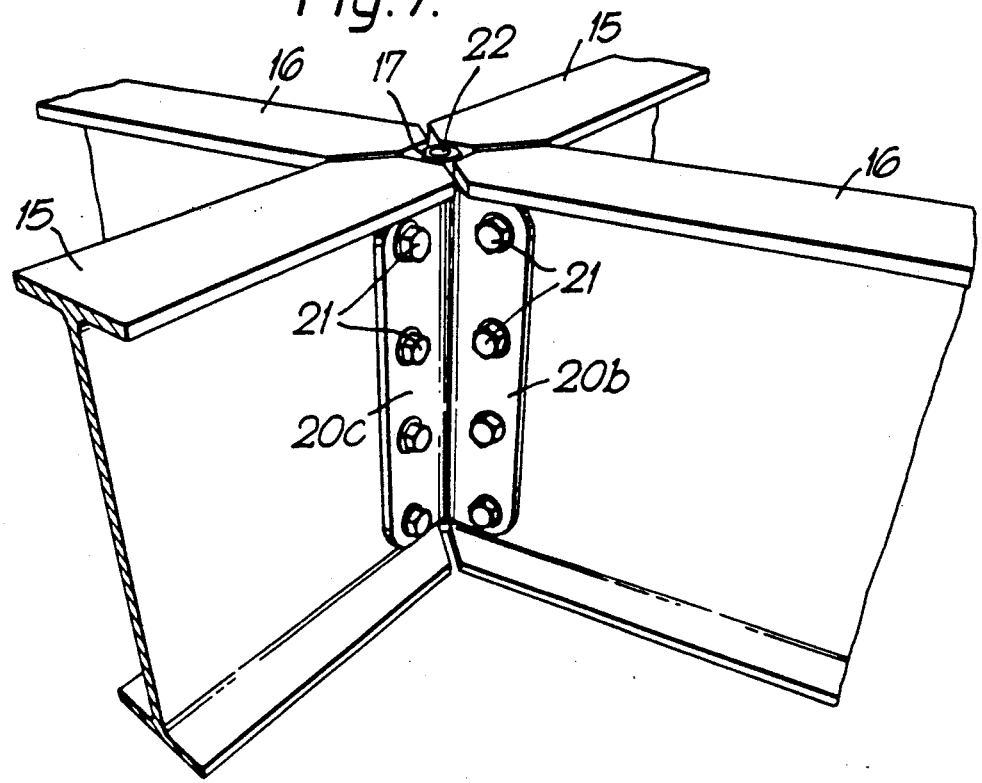
FIG. 7 is a perspective view of part of a rib and spar assembly in accordance with a second embodiment of the invention.
Figure 8:
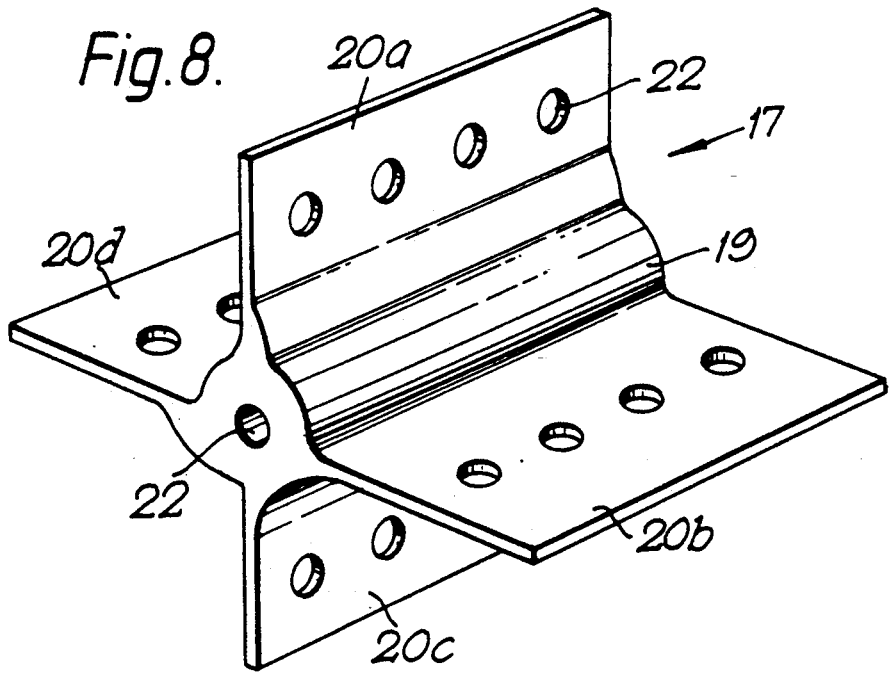
FIG. 8 is a perspective view of a cleat for use in a second embodiment of the invention.

Ribs and spars are formed from CFC and then fastened together by cleats which are V-shaped metal plates. In FIG. 4 a rib 11 and spar 12 having an I-shaped cross-section are bolted together by fasteners 13 located in cleats. Four cleats are required per joint, but just one can be seen in FIG. 4 designated by reference numeral 5.

Next, the upper and lower surfaces of the framework are machined to the correct shape to match the inner surfaces of the preformed skins. When the rib and spar framework has been assembled, then installation of necessary pipe-work and wiring can be done.

Finally both skins are bonded to the framework using conventional apparatus. For example a hot-setting adhesive is used and the entire assembly is put in an autoclave while the adhesive cures.

In a second embodiment of the invention, upper and lower wing skins are formed in the same manner as for the first embodiment with reference to FIG. 3.

Construction of the rib and spar framework will now be described with reference to FIGS. 5 to 8. A framework 14 is assembled from I-section CFC ribs 15 and spars 16 held together by cruciform cleats 17. The rib and spar ends are chamfered where a joint 18 needs to be made. Chamfering the ends is advantageous because it reduces the bolt offset on the cruciform cleat 17. The cleats 17 are of cruciform cross-section comprising a cylindrical portion 19 and four arms 20a–20d. The cylindrical portion 19 is located at the junction of the four rib and spar members to be jointed and each arm 20a–20d is bolted by means of metal fasteners 21 to one of the ribs 15 or spars 16.

The cleats 17 are made from titanium and are extruded, out to the correct length and then machined at each of their ends. Jig location holes 22 are drilled in each face of the cylindrical portion 19 and all fastener holes 22 are drilled before assembly of the rib/spar framework 14. The framework 14 is assembled around the jigged cleat 17 and access for drilling fastener holes in the ribs 15 and spars 16 can be gained from both sides of the framework 14.

Next the upper and lower surfaces of the ribs 15 and spars 16 are machined to the exact inner skin profile. During this operation, flexing of the framework 14 is reduced to a minimum because each cleat 17 has a firm jig location.

When the framework 14 is complete, necessary pipework and cabling can be installed.

Finally, the upper and lower skins are bonded to the framework (using a hot-setting adhesive) in an autoclave. Anti-peel fasteners are installed in the drilled holes 22 in the cleats 17 as required.

In a third embodiment, a mixture of V-shaped and cruciform cleats are used in assembly of the rib/spar framework.

We claim:

1. A method of manufacturing an aircraft wing comprising the steps of:
    (i) forming upper and lower wing skins, each of said wing skins having a contoured inner surface;
    (ii) forming a framework of ribs and spars, by joining said ribs and spars together with cleats;
    (iii) machining said framework to match the contours of said inner surfaces of the upper and lower wing skins to produce a machined framework and;
    (iv) bonding together said machined framework and said upper and lower skins; said ribs, spars and wing skins all being of carbon fibre composite material.

2. A method according to claim 1 in which said ribs and spars have an I-shaped cross-section.

3. A method according to claim in which said cleats comprise V-shaped metal plates.

4. A method according to claim 1 in which said cleats are of cruciform cross-section having a central cylindrical portion and four arms extending therefrom, said arms for attachment to a rib or a spar.

5. A method according to claim 4 in which said central cylindrical portion of each cleat is provided with jig location holes so that said framework can be assembled on a jig and so that after bonding of the upper and lower skins, the holes serve as locations for anti-peel fasteners.

* * * * *